United States Patent
Klein et al.

(10) Patent No.: US 7,632,386 B2
(45) Date of Patent: Dec. 15, 2009

(54) PROCESS FOR PRODUCING COATINGS ON ELECTRICALLY CONDUCTIVE SUBSTRATES BY CATHODIC ELECTRODEPOSITION COATING

(75) Inventors: Klausjoerg Klein, Wuppertal (DE); Gabriele Buettner, Ratingen (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 916 days.

(21) Appl. No.: 10/650,410

(22) Filed: Aug. 28, 2003

(65) Prior Publication Data

US 2005/0045490 A1 Mar. 3, 2005

(51) Int. Cl.
*C25D 13/13* (2006.01)

(52) U.S. Cl. .................. 204/507; 148/518

(58) Field of Classification Search ......... 204/471–512, 204/517; 148/518
See application file for complete search history.

(56) References Cited

U.S. PATENT DOCUMENTS

| | | | |
|---|---|---|---|
| 4,421,620 A * | 12/1983 | Kaylo et al. ................. 428/416 |
| 4,652,353 A | 3/1987 | Honig et al. | |
| 4,655,787 A | 4/1987 | Renton | |
| 4,840,715 A * | 6/1989 | Misawa et al. ............... 204/484 |
| 5,047,128 A * | 9/1991 | Hawkins et al. ............. 204/472 |
| 5,236,564 A | 8/1993 | Berg et al. | |
| 5,356,529 A * | 10/1994 | Eswarakrishnan et al. .. 205/224 |
| 5,554,700 A | 9/1996 | Schipfer et al. | |
| 5,670,441 A | 9/1997 | Foedde et al. | |
| 5,702,581 A | 12/1997 | Kerlin et al. | |
| 5,810,987 A * | 9/1998 | Opitz ........................ 204/512 |
| 5,908,912 A | 6/1999 | Kollah et al. | |
| 5,936,013 A | 8/1999 | Feola et al. | |
| 5,972,189 A | 10/1999 | McMurdie et al. | |
| 6,174,422 B1 | 1/2001 | Hönig et al. | |
| 6,265,079 B1 | 7/2001 | Nishiguchi et al. | |
| 6,342,144 B1 * | 1/2002 | December ................... 204/488 |
| 6,375,820 B1 * | 4/2002 | Tomizaki et al. ............ 204/489 |
| 6,436,201 B1 | 8/2002 | Sugita et al. | |
| 6,541,120 B1 | 4/2003 | Klein et al. | |
| 6,841,199 B2 * | 1/2005 | Martin et al. ............ 427/419.8 |
| 2003/0082368 A1 | 5/2003 | Reuter et al. | |
| 2004/0089549 A1 | 5/2004 | David et al. | |

FOREIGN PATENT DOCUMENTS

| | | |
|---|---|---|
| DE | 43 03 787 C1 | 3/1994 |
| DE | 43 03 812 C1 | 5/1994 |
| DE | 44 34 593 A1 | 4/1996 |
| EP | 1 041 125 A1 | 4/2000 |
| GB | 2368302 A | 5/2002 |
| WO | WO 96/10057 A1 | 4/1996 |
| WO | WO 00/47642 A1 | 8/2000 |
| WO | WO 00/50522 A1 | 8/2000 |
| WO | WO 01/51570 A1 | 7/2001 |

OTHER PUBLICATIONS

The European Search Report Application No. EP 04018686, Mailed: Dec. 22, 2004.
Copending U.S. Appl. No. 10/668,956, filed Sep. 23, 2003.

* cited by examiner

*Primary Examiner*—Kishor Mayekar
(74) *Attorney, Agent, or Firm*—Brian J. Myers

(57) ABSTRACT

A process for producing a CED coating by cathodic electrodeposition of a coating on an electrically conductive substrate in a CED coating bath and thermal cross-linking of the CED coating film obtained, wherein before thermal cross-linking outside of the CED coating bath, the CED coating film is brought into contact with an aqueous preparation of at least one metal compound, wherein the at least one metal compound is a compound of a metal with an oxidation number of +2 or higher and is selected from the group consisting of compounds containing cations of the metal, compounds forming cations of the metal in aqueous medium, compounds containing cations containing the metal, compounds forming cations containing the metal in aqueous medium, compounds comprising outwardly neutral complexes of the metal, colloidal oxide of the metal and colloidal hydroxide of the metal, wherein the metal itself is selected from the group consisting of metals having atomic numbers of 20 to 83 with the express exclusion of chromium, arsenic, cadmium, antimony, mercury, thallium and lead.

7 Claims, No Drawings

PROCESS FOR PRODUCING COATINGS ON ELECTRICALLY CONDUCTIVE SUBSTRATES BY CATHODIC ELECTRODEPOSITION COATING

FIELD OF THE INVENTION

The invention relates to a process for producing coatings on electrically conductive substrates by cathodic electrodeposition coating (CED coating), wherein, before thermal cross-linking (curing), the CED coating film is brought into contact with an aqueous preparation of at least one metal compound.

BACKGROUND OF THE INVENTION

CED coating is a well-known process of coating electrically conductive substrates, in particular, metallic substrates. In CED coating, the workpiece is connected to the direct current source as a cathode and the CED coating film is then deposited on the substrate surface by the current. The CED coating film is then thermally cross-linked.

In CED coating, the substrates are generally initially subjected to a pre-treatment and then passed to the CED coating process. The substrates are coated in a conventional CED coating bath (CED coating composition, CED coating agent, CED coating paint), and excess, inadequately adhering CED coating composition is then rinsed from the substrates back into the CED coating tank. To avoid an increase in the volume of the CED coating bath, the substrates are conventionally rinsed with ultrafiltrate obtained from the CED coating bath.

The ultrafiltrate is obtained by known methods and, in addition to water, contains, for example, low molecular constituents, neutralizing agents, solvents and dissolved salts from the CED coating bath.

Finally, the substrates can be rinsed with water.

A process is described in U.S. Pat. No. 4,655,787 in which, by using the distribution principle, additives are introduced into an uncured CED coating film. In this process, substrates having a CED coating film are immersed in a dipping solution which contains the appropriate additive. The additive is absorbed within the CED coating film in the process. UV stabilizers, antioxidants, plasticizers, corrosion inhibitors, anti-static agents and in particular, dyes are used as additives. These are each low molecular materials with low water solubility and are dissolved in a solvent medium which contains water, water-miscible solvents and a hydrotrope. Salts and urea compounds are mentioned as hydrotropes and facilitate transition of a dye from the dipping solution into the non-cross-linked CED coating film by a salting-out effect. Once the distribution process has progressed to the desired extent, the substrate is rinsed and subjected to a baking process.

The post-treatment of non-cross-linked CED coating films prior to baking with an oil-in-water emulsion of water-insoluble, polymeric, non-ionic surface defect-counteracting agents to prevent the formation of surface defects, such as craters, in the CED coating film as taught in DE 43 03 812.

DE 43 03 787 describes the post-treatment of uncured CED coating films prior to baking with an aqueous polyvinyl alcohol solution, likewise with the goal of preventing the formation of surface defects in the CED coating film.

Metal compounds, for example, specific metal salts, are used in CED coating compositions, in particular, as cross-linking catalysts and/or anti-corrosion additives. In particular, lead compounds, such as lead silicate, often also in combination with tin compounds, such as dibutyl tin oxide, have been used. More recently, lead-free CED coating compositions have become known. CED coating compositions containing bismuth compounds have acquired particular significance, as described, for example, in U.S. Pat. No. 5,936,013, U.S. Pat. No. 5,702,581, U.S. Pat. No. 5,554,700, U.S. Pat. No. 5,908,912, U.S. Pat. No. 6,174,422, U.S. Pat. No. 5,670,441, WO 96/10057, U.S. Pat. No. 5,972,189, WO 00/50522, U.S. Pat. No. 6,265,079, EP 1 041 125, WO 00/47642, WO 01/51570, DE-A 44 34 593 and U.S. Pat. No. 5,702,581.

It has been found that the metals desired in the CED coating film and incorporating into the CED coating film as a constituent of the CED coating composition do not have to be present as metal compounds in the CED coating composition. They may be passed onto and or be passed into the still non-cross-linked CED coating film after CED coating, before subsequent thermal cross-linking. This can be accomplished by bringing the still non-cross-linked CED coating film into contact with an aqueous preparation of one or more appropriate metal compounds.

An advantage of this invention is that the production of CED coating compositions can be simplified and there is a greater freedom for the formulation of CED coating compositions.

Finally, components which are incompatible with the at least one metal compound can thus also be incorporated into the CED coating composition as a constituent of its formulation.

In general, problems, in particular stability problems, as can occur in dispersions containing metal ions, can be avoided in the CED coating composition.

The process according to the invention also allows at least one further different metal to be subsequently added onto and/or into a still non-cross-linked CED coating film containing one or more metals, after CED coating.

SUMMARY OF THE INVENTION

The invention relates to a process for producing a CED coating film by cathodic electrodeposition of a coating on an electrically conductive substrate in a CED coating bath and thermal cross-linking of the CED coating film obtained, wherein before thermal cross-linking outside of the CED coating bath, the CED coating film is brought into contact with an aqueous preparation of at least one metal compound, wherein the at least one metal compound is a compound of a metal with an oxidation number of +2 or higher and is selected from the group consisting of compounds containing cations of the metal, compounds forming cations of the metal in aqueous medium, compounds containing cations containing the metal, compounds forming cations containing the metal in aqueous medium, compounds comprising outwardly neutral complexes of the metal, colloidal oxide of the metal and colloidal hydroxide of the metal, wherein the metal itself is selected from the group consisting of metals having atomic numbers of 20 to 83 with the express exclusion of chromium, arsenic, cadmium, antimony, mercury, thallium and lead.

DETAILED DESCRIPTION OF THE EMBODIMENTS

In the process according to the invention, electrically conductive, in particular metallic substrates, are provided with a CED coating film by cathodic electrodeposition from a CED coating composition in a per se known manner.

The CED coating compositions according to the invention comprise known aqueous cathodically depositable electrodeposition coating agents. The CED coating compositions are aqueous coating compositions with a solids content of, for example, 10 to 30 wt. %. The solids content consists of the resin solids content, optionally present pigments and/or fillers and further non-volatile additives. Preferably, the solids content does not contain lead compounds or compounds of other toxic metals, such as, chromium, arsenic, cadmium, antimony, mercury or thallium. The resin solids are composed of conventional self- or externally cross-linking CED binder(s) having cationic substituents or substituents which can be converted to cationic groups; optionally, present are cross-linking agent(s) and optionally, present are other resin(s) contained in the CED coating agent, such as, paste resin(s). The cationic groups may be cationic groups or basic groups which can be converted to cationic groups, e.g., amino, ammonium, quaternary ammonium, phosphonium and/or sulfonium groups. Binders having basic groups are preferred. Nitrogen-containing basic groups, such as, amino groups are particularly preferred. These groups may be present in the quaternized form or they are converted to cationic groups with a conventional neutralizing agent, such as, amidosulfuric acid or methanesulfonic acid, lactic acid, formic acid, acetic acid.

The cationic or basic binders may be resins containing, for example, primary, secondary and/or tertiary amino groups, the amine values of which are, e.g., 20 to 250 mg KOH/g. The weight-average molecular mass (Mw) of the CED binders is preferably 300 to 10,000. There are no restrictions on the CED binders that can be used. The various CED binders or CED binder/cross-linking agent combinations known, for example, from the extensive patent literature may be used. Examples of such CED binders include amino(meth)acrylate resins, amino epoxy resins, amino epoxy resins with terminal double bonds, amino epoxy resins with primary OH groups, amino polyurethane resins, amino group-containing polybutadiene resins or modified epoxy resin/carbon dioxide/amine reaction products. As self-crosslinking or externally cross-linking binders, these CED binders have functional groups capable of crosslinking, in particular hydroxyl groups, for example, corresponding to a hydroxyl number of 30 to 300 mg KOH/g, preferably 50 to 250 mg KOH/g.

These binders may be self-crosslinking or they may be used in combination with cross-linking agents known to the skilled person. Examples of such cross-linking agents include aminoplast resins, blocked polyisocyanates, cross-linking agents with terminal double bonds, polyepoxide compounds, cross-linking agents with cyclic carbonate groups or cross-linking agents that contain groups capable of transesterification and/or transamidization. Preferred systems are those which self-crosslink or externally crosslink by reaction of groups comprising active hydrogen with blocked isocyanate groups, in particular those which crosslink by reaction of hydroxyl and/or primary and/or secondary amino groups with blocked isocyanate groups to form urethane and/or urea groups.

The CED binders may be converted to CED binder dispersions and used as such for the preparation of CED coating agents. The preparation of CED binder dispersions is known to the skilled person. For example, CED binder dispersions may be prepared by converting CED binders to an aqueous dispersion by neutralization with acid and dilution with water. The CED binders may also be present in mixture with cross-linking agents and converted together with these to an aqueous CED binder dispersion. If present, organic solvent(s) may be removed to the desired content before or after conversion to the aqueous dispersion, for example, by vacuum distillation.

In addition to the binder(s), optionally present cross-linking agent(s) and water, the CED coating agents may also contain pigments, fillers, organic solvents and/or conventional coating additives.

Examples of pigments and fillers include the conventional inorganic and/or organic colored pigments and/or special-effect pigments and/or fillers such as, e.g., titanium dioxide, iron oxide pigments, carbon black, phthalocyanine pigments, quinacridone pigments, metallic pigments, interference pigments, kaolin, talc, silica. The pigment plus filler/resin solids weight ratio of the CED coating agents is, for example, from 0:1 to 0.8:1, and for pigmented coating agents it is preferably from 0.05:1 to 0.4:1.

Examples of organic solvents which may be used in the ready-to-apply CED coating bath in amounts of, for example, up to 5 wt. % include polar aprotic water-miscible solvents such as, N-methylpyrrolidone, dimethyl sulfoxide, dimethyl formamide, sulfolane; alcohols, such as, cyclohexanol, 2-ethylhexanol, butanol; glycol ethers, such as, methoxypropanol, ethoxypropanol, butoxyethanol, diethylene glycol diethyl ether; ketones, such as, methyl isobutyl ketone, methyl ethyl ketone, cyclohexanone; hydrocarbons.

Examples of conventional coating additives which may be used in the CED coating agents in amounts of, for example, 0.1 wt. % to 5 wt. %, based on the resin solids, include wetting agents, neutralizing agents, anti-crater agents, leveling agents, antifoaming agents, light stabilizers and antioxidants.

The CED coating compositions can also contain one or more metal compounds, for example as cure catalyzing and/or anticorrosion additives. Examples for such metal compounds are metal compounds as are constituents of the aqueous preparation used in the process according to the invention or other metal compounds, but preferably not lead compounds or compounds of other toxic metals, such as, chromium, arsenic, cadmium, antimony, mercury or thallium. If the CED coating compositions do contain such metal compounds as the aqueous preparations used in the process according to the invention, they expediently do not contain the same metal compounds and preferably also no other compounds of the same metal(s).

CED coating layers, for example, in a dry layer thickness of 10 μm to 30 μm, may be deposited in the usual way from the CED coating agents onto electrically conductive, particularly, metallic substrates connected up as the cathode.

Metal substrates used may be parts made of all conventional metals, for example, the metal parts usually used in the automotive industry, particularly automotive bodies and parts thereof. Examples include components of aluminum, magnesium or alloys thereof and, in particular, galvanized or non-galvanized steel. Before CED coating, the metal substrates may undergo a conversion treatment, for example, they may be, in particular, phosphated and optionally, passivated.

After coating with the CED coating composition and removal of excess, inadequately adhering CED coating composition, for example, by rinsing with ultrafiltrate and subsequently with water or even only with water, the CED coating film, in contrast to the prior art, is not initially thermally cross-linked but previously brought into contact with an aqueous preparation of at least one metal compound, wherein the at least one metal compound is a compound of a metal with an oxidation number of +2 or higher and is selected from the group consisting of compounds containing cations of the metal, compounds forming cations of the metal in aqueous medium, compounds containing cations containing the metal, compounds forming cations containing the metal in aqueous medium, compounds comprising outwardly neutral complexes of the metal, colloidal oxide of the metal and colloidal hydroxide of the metal, wherein the metal itself is selected from the group consisting of metals having atomic numbers of 20 to 83 with the express exclusion of chromium, arsenic, cadmium, antimony, mercury, thallium and lead.

The aqueous preparation of the at least one metal compound (one metal compound or a plurality of compounds of the same metal or of different appropriate metals) can be in various forms, for example in the form of an aqueous solution or an aqueous colloidal solution. The aqueous preparation can be buffered.

The at least one metal compound is a compound of a metal with an oxidation number of +2 or higher. The metal itself is selected here from the group consisting of metals having atomic numbers of 20 to 83; chromium, arsenic, cadmium, antimony, mercury, thallium and lead are expressly excluded. Appropriate compounds of titanium, vanadium, iron, zinc, yttrium, zirconium, tin, cerium, neodymium, or bismuth, especially of bismuth, are preferred.

The at least one metal compound can, for example, be a colloidal metal oxide or metal hydroxide, an appropriate metal complex compound, for example, a metal chelate complex or preferably an appropriate metal salt of an inorganic or organic acid, wherein the term "metal salt" includes not only salts consisting of appropriate doubly or multiply positively charged metal cations and acid anions, but also, for example, salts consisting of cations containing the metal and acid anions, and metalloxy salts. Examples of inorganic or organic acids from which the metal salts can be derived are hydrochloric acid, sulphuric acid, nitric acid, inorganic or organic sulphonic acids, carboxylic acids, for example, formic acid or acetic acid, amino carboxylic acids and hydroxy carboxylic acids, such as lactic acid or dimethylolpropionic acid.

Preferred metal compounds are sulphuric acid salts, nitric acid salts, hydrochloric acid salts, acetic acid salts, formic acid salts and hydrocarbyl sulphonic acid salts, such as alkylsulphonic acid salts of yttrium or neodymium and, in particular, nitric acid salts, acetic acid salts, methoxy acetic acid salts, aminocarboxylic acid salts or especially hydroxycarboxylic acid salts and sulphonic acid salts of bismuth. Preferred examples of the last bismuth salts are aliphatic hydroxycarboxylic acid salts of bismuth, such as lactic acid salts or dimethylolpropionic acid salts of bismuth, for example, bismuth lactate or bismuth dimethylolpropionate; amidosulphonic acid salts of bismuth; hydrocarbylsulphonic acid salts of bismuth, in particular alkyl sulphonic acid salts, especially methane sulphonic acid salts of bismuth, for example, bismuth methane sulphonate.

The aqueous preparations can be produced by mixing water and the at least one metal compound and optionally, additional additives, such as emulsifiers, organic solvents, wetting agents and/or complexing agents. The at least one metal compound can be added here as such or is prepared from suitable starting components during production of the aqueous preparation. For example an appropriate metal salt can be formed by reacting metal oxide, metal hydroxide or metal carbonate with a hypostoichiometric, stoichiometric or hyperstoichiometric quantity of a corresponding acid and does not necessarily have to be isolated in substance.

In addition to water and the at least one metal compound in a quantity corresponding, for example, to 100 to 50,000 ppm of the appropriate metal, the aqueous preparations can contain, for example, up to 5% by weight of additives.

The appropriate metal can be present in a wide variety of forms in the aqueous preparation, and the composition of the aqueous preparation is to be selected such that a very fine homogeneous distribution of the appropriate metal is ensured and no precipitation phenomena occur. The appropriate metal can, for example, be present dissolved as an outwardly neutral metal complex, as a cation, as a metalloxy cation and/or as a cation containing the appropriate metal, for example, a complexed cation, for example, as a cationic chelate complex and/or very finely distributed, for example, colloidally dissolved, for example, as a colloidal oxide or hydroxide.

In the description and in the claims "the metal" or "the appropriate metal" is always spoken of in conjunction with the aqueous preparation used in the process according to the invention. Despite use of the singular this term should not be understood exclusively as a single metal because the at least one metal compound, even in the case of just one metal compound, can also contain, in addition to an appropriate metal, one or more additional metals which likewise pertain to the definition of the appropriate metal.

Furthermore, the aqueous preparation can also contain compounds of other metals than the metals mentioned above and/or also other metal compounds of the same metals as mentioned above. However, lead compounds and compounds of other toxic metals, such as chromium, arsenic, cadmium, antimony, mercury or thallium are excluded.

The substrate provided with the non-cross-linked CED coating film is brought into contact with the aqueous preparation, for example, by dipping, spraying and/or rinsing.

With the dipping process the substrate can be passed through a tank filled with the aqueous preparation. After emergence excess aqueous preparation drains from the substrate and runs back into the tank. The same thing occurs in the spraying or rinsing process. The excess aqueous preparation drains and can be collected and recycled.

The aqueous liquid not remaining on the substrate can be collected and recycled to the supply of aqueous preparation again. Collection can be carried out by direct recycling, on the one hand, or else the aqueous liquid can, for example, be worked up by filtration and then be mixed again with the aqueous preparation. In addition, the aqueous preparation can be continuously mixed with a replenishing concentrate to ensure a substantially constant composition. This can also be carried out automatically if suitable measured variables are selected. For example, conductivity, pH or specific ion concentrations can be used as the measured variable.

It should be ensured that contact is made uniformly, i.e. contact of the entire surface of the still non-cross-linked CED coating film with the aqueous preparation and a practically constant composition of the aqueous preparation during contact is to be ensured and the latter even though or precisely because metal passes onto and/or into the non-cross-linked CED coating film. There is therefore, a need for a continuous supply of fresh aqueous preparation or aqueous preparation which is practically unchanged in composition to the surface of the still non-cross-linked CED coating film. Finally, a large excess of aqueous preparation relative to the mass of the non-cross-linked CED coating film is used. Making contact between the substrate provided with the non-cross-linked CED coating film and the aqueous preparation by way of the dipping process is particularly advantageous in this regard since there is a large excess of aqueous preparation relative to the mass of the non-cross-linked CED coating film.

The process step of making contact can be integrated in existing CED coating plants, for example, in that the aqueous preparation is used instead of water in the last rinsing stage. The step of making contact can, however, also take place in an additional rinsing stage following the conventional CED coating rinsing stages as a dipping, spraying and/or rinsing process before thermal cross-linking of the CED coating film.

The process according to the invention is carried out in such a way that, for example, 0.1 to 2% by weight of the appropriate metal (calculated as metal), relative to the resin solid of the CED coating film, pass from the aqueous preparation onto and/or into the non-cross-linked CED coating film. It is unclear in what form the metal is present after passing onto and/or into the non-cross-linked CED coating film: whether in the same form as in the aqueous preparation or else in a chemically different form, for example, complexed by means of functional groups originating from the resin solid of the CED coating film and active as ligands, or as a precipitated hydroxide as a consequence of contact with the strongly alkaline, non-cross-linked CED coating film. If contact has been made without the assistance of electric current, the metal is most likely not present in elementary form after passing onto the and/or into the non-cross-linked CED coating film.

When carrying out the process without electric current the transferred quantity of metal can be controlled substantially by two processing parameters. With a given metal compound, the concentration thereof in the aqueous preparation and the contact time between the aqueous preparation and the non-cross-linked CED coating film is thus of critical importance for controlling the transferred quantity of metal. The higher the concentration and the longer the contact time selected, the more metal can pass onto and/or into the non-cross-linked CED coating film.

The contact time can be varied over a wide range. Practical contact times are, for example, 10 seconds to 5 minutes. The concentration of the metal(s) in the aqueous preparation and the contact time can be coordinated with one another so that the desired quantity of metal passes onto and/or into the non-cross-linked CED coating film.

In a preferred embodiment of the process according to the invention, the process is not carried out without electric current, rather the substrate provided with the still non-cross-linked CED coating film is connected as a cathode during contact with the aqueous preparation. Voltages in the range of, for example, 20 to 300 V are applied there. For example, special steel anodes or conventional anode cells used for electrodialysis can be used as counter-electrodes. With this procedure, the quantity of metal passing onto and/or into the non-cross-linked CED coating film can be controlled particularly simply and effectively in that a quantity of charge necessary for the passage of the desired quantity of metal onto and/or into the non-cross-linked CED coating film is allowed to flow. The assistance of a current is used here in particular to accelerate conveyance of the metal in the direction of the non-cross-linked CED coating film and therefore, also, to accelerate the passage of the metal onto and/or into the non-cross-linked CED coating film. In the current-assisted embodiment of the process according to the invention, it is expedient if the metal is present in the aqueous preparation in the form of or as a constituent of cations. As already described above in the currentless embodiment, the chemical nature of the metal which has passed onto and/or into the non-cross-linked CED coating film is unclear. Although a passage of the metal onto and/or into the non-cross-linked CED coating film in elementary form is not sought, the transferred metal may be partially present in elementary form in the current-assisted embodiment of the process according to the invention on and/or in the non-cross-linked CED coating film.

A technically identical effect can be achieved in particular with the current-assisted embodiment of the process according to the invention with respect to the course of the thermal curing process as well as to the properties of the cured CED coating film, so there is practically no significant difference from a CED coating film which has been applied from a CED coating composition containing the appropriate metal compound(s).

Once the desired quantity of metal has passed from the aqueous preparation onto and/or into the non-cross-linked CED coating film, contact between non-cross-linked CED coating film and aqueous preparation can be ended and the substrate can, if desired, be rinsed with water by a dipping, spraying and/or rinsing process. The CED coating film is then thermally cross-linked in a conventional manner, in particular by convection and/or infrared irradiation. Thermal cross-linking takes place by baking at object temperatures of, for example, 130 to 200° C.

After thermal cross-linking of the CED coating film, subsequent materials conventional in the automotive sector can be applied, such as underseal, adhesive materials, sealing elements and/or one or more further conventional paint coating layers can be applied, for example, a one-layer top coat, a primer surfacer-free construction made of color and/or special effect providing base coat and external clear coat or a multi-coat construction made of primer surfacer and one-layer top coat or two-layer top coat consisting of color and/or special effect providing base coat and external clear coat.

Further coating can also take place here in such a way that the one or more further coating layers are applied in a wet-on-wet process and are jointly thermally cross-linked with the CED coating film in one operating step.

The following examples illustrate the invention.

EXAMPLES

Example 1

Production of Bismuth Lactate 901 parts by weight of 70% by weight aqueous lactic acid were introduced and heated to 70° C. 466 parts bismuth oxide ($Bi_2O_3$) were added batchwise while stirring. After stirring for an additional 6 hours at 70° C., the mixture was cooled to about 20° C. and left for 12 hours without stirring. Finally, the precipitate was filtered off, washed with a little water and ethanol and dried at a temperature of 40 to 60° C.

Example 2

Preparation of CED Coating Dispersions a) 832 parts of the monocarbonate of an epoxy resin based on bisphenol A (commercial product Epikote® 828) were mixed with 830 parts of a commercial polycaprolactone polyol (commercial product CAPA 205) and 712 parts of diglycol dimethylether and reacted at 70° C. to 140° C. with 0.3% $BF_3$-etherate as catalyst until an epoxy value of 0 was obtained. In the presence of 0.3% Zn acetyl acetonate as catalyst, 307 parts of a reaction product of 174 parts of toluene diisocyanate and 137 parts of 2-ethyl hexanol were added to this product at 40° C. to 80° C. with the addition of 0.3% benzyl trimethylammonium hydroxide. The reaction was continued until an NCO value of about 0 was obtained and the mixture then adjusted to a solids content of 70 wt. % with diglycol dimethyl ether.

b) 618 parts of a reaction product of 348 parts of toluene diisocyanate and 274 parts of 2-ethyl hexanol were added slowly to 1759 parts of a biscarbonate of an epoxy resin based on bisphenol A (commercial product Epikote® 1001) at 60° C. to 80° C. with the addition of 0.3% benzyl trimethylammonium hydroxide. The reaction was continued to an NCO value of about 0.

c) At a temperature of 20° C. to 40° C., 622 parts of the reaction product of 137 parts of 2-ethylhexanol with 174 parts of toluene diisocyanate with benzyltrimethylammonium hydroxide catalysis (0.3%) were added to 860 parts of bish-examethylene triamine dissolved in 2315 parts of methoxy propanol and the reaction was continued until an NCO content of about 0 was obtained. Then 4737 parts of the reaction product b) and 3246 parts of the reaction product a) (in each case 70% in diglycol dimethyl ether) were added and reacted at 60° C. to 90° C. The reaction was ended at an amine value of about 32 mg KOH/g. The product obtained was distilled under vacuum to a solids content of about 85%.

d1) Neutralization was carried out with 30 mmole of formic acid/100 g of resin. The mixture was then heated to 70° C. and bismuth lactate (from Example 1) was added in portions, with stirring, over a period of two hours, in an amount such that 1 wt. % of bismuth, based on resin solids content, was present in the mix. Stirring was then continued for another 6 hours at 60° C. to 70° C. After cooling, the mixture was converted with deionized water to a dispersion with a solids content of 40 wt. %.

d2) The same method was used as described in d1), except that no bismuth lactate was used.

Example 3a

Production of a CED Clear Coat Containing Bismuth Lactate 815.5 parts of the dispersion from Example 2 d1) were adjusted with 50 wt-% aqueous formic acid to a meq value of 45 mmol of acid/100 g of solids and diluted to a solids content of 15 wt-% with deionized water.

Example 3b

Production of a Metal-free CED Clear Coat 815.5 parts of the dispersion from Example 2 d2) were adjusted with 50 wt-% aqueous formic acid to an meq value of 45 mmol of acid/100 g of solids and diluted to a solids content of 15 wt-% with deionized water.

Examples 4a-d

Production of CED Coatings

Example 4a

Degreased, non-phosphated test panels were coated with 20 μm thick CED coating films from the CED clear coat bath 3a (coating conditions: 3 minutes at 30° C. at a deposition voltage of 220 V; rinsing with deionised water before baking; baking conditions: 20 minutes at 175° C. object temperature).

Example 4b

The method was carried out as in Example 4a but using the CED-clear coat bath 3b.

Example 4c

The method was carried out as in Example 4b, wherein the CED-coated panels were, however, dipped in an aqueous solution of bismuth lactate (bismuth content 0.2% by weight) for 30 seconds before baking.

Example 4d

The method was carried out as in Example 4b, wherein the CED-coated panels connected as a cathode (voltage applied: 120V) were, however, dipped in an aqueous solution of bismuth lactate (bismuth content 0.1% by weight) for 3 minutes before baking.

The baked test panels from Examples 4a to d were investigated to test the CED coating films for completeness of the cross-linking with respect to their resistance to acetone. For this purpose, a wad of cotton wool soaked with acetone was applied to the baked CED coating film and covered with a watch glass. After acetone exposure for different amounts of time, watch glass and wad of cotton wool were removed and after 30 seconds (to volatilize acetone residues) testing for softening (not o.k.) and absence of changes (o.k.) was carried out by scratching using a horn spatula.

Table 1 summarizes the acetone exposure times necessary for impairment of the baked CED coating films thus determined. Values of >180 seconds represent proper cross-linking as even after acetone exposure lasting more than 180 seconds, no change in the CED coating film could be found.

TABLE 1

| CED coating film | Acetone resistance (seconds) |
|---|---|
| 4a (standard) | >180 |
| 4b (comparison) | <15 |
| 4c (according to the invention) | 45 |
| 4d (according to the invention) | >180 |

Example 4a (bismuth lactate as constituent of the CED coating agent) is a standard example wherein good acetone resistance (complete cross-linking) is achieved. In example 4b (no bismuth lactate in the CED coating agent) cross-linking is incomplete as becomes apparent from the <15 acetone resistance value. Acetone resistance increases with Example 4c compared to Example 4b when the still uncross-linked CED coating is brought into contact with bismuth lactate solution before baking. Acetone resistance increases even more with Example 4d compared to Example 4b when the still uncross-linked CED coating is brought into contact with bismuth lactate solution before baking and the contacting is additionally current-assisted.

Examples 5a-c

Production of CED Coating Films

Example 5a

Perforated (hole diameter 10 mm), degreased, non-phosphated test panels were coated with 20 μm thick CED coatings from the cathodic electrodeposition clear coat bath 3a (coating conditions: 3 minutes at 30° C. with a deposition voltage of 220 V; rinsing with deionized water before baking; baking conditions: 20 minutes, 175° C. object temperature).

Example 5b

The method was carried out as in Example 5a, wherein the CED-coated panels were, however, immersed before baking in an aqueous solution of neodymium methane sulphonate (neodymium content 0.3% by weight; produced by diluting an 8% by weight aqueous neodymium methane sulphonate solution, obtainable by reacting neodymium (III) oxide with the stoichiometric quantity of methane sulphonic acid and dilution with water to a content of 8% by weight) for 30 seconds.

Example 5c

The method was carried out as in Example 5a, wherein the CED-coated panels were, however, immersed before baking in an aqueous solution of yttrium (III) acetate (yttrium content 0.1% by weight) for 30 seconds.

The baked test panels from Examples 5a to c were exposed to a salt spray mist according to DIN 50 021-SS for 120 hours. The hole edges were evaluated with respect to edge rust (characteristic values CV 0 to 5; CV 0, edge without rust; CV 1, isolated rust spots at edges; CV 2, rust spots at less than ⅓ of the edges; CV 3, ⅓ to ⅔ of the edges covered in rust; CV 4, more than ⅔ of the edges covered in rust; CV 5, edges completely rusty).

TABLE 2

| CED coating clear coat | Edge rust, characteristic value |
| --- | --- |
| 5a (standard) | 4-5 |
| 5b (according to the invention) | 3-4 |
| 5c (according to the invention) | 3 |

Edge rust properties improve when treating the still uncross-linked CED coating layers of Example 5a (standard example without additional treatment) with aqueous solutions of neodymium methane sulphonate (Example 5b) or yttrium acetate (Example 5c) before baking.

What is claimed is:

1. A process for producing a coating, said process comprising the sequential steps of:
   a) cathodically electrodepositing a cathodic electrodeposition (CED) coating composition on a conductive substrate by immersing the substrate in a CED coating bath to form a CED coating film;
   b) rinsing the CED coating film with (i) ultrafiltrate and subsequently with water or (ii) water, to remove excess and/or non-adhering CED coating composition;
   c) contacting the CED coating film with an aqueous preparation of at least one bismuth compound; and
   d) thermally crosslinking the CED coating film;
   wherein the aqueous preparation of part (c) consists essentially of water, 50 to 100,000 ppm of bismuth compound, and optionally 5% by weight of additives, and wherein the at least one bismuth compound is a bismuth salt selected from the group consisting of nitric acid salts of bismuth, acetic acid salts of bismuth, methoxy acetic acid salts of bismuth, amino carboxylic acid salts of bismuth, hydroxy carboxylic acid salts of bismuth and sulphonic acid salts of bismuth.

2. The process of claim 1, wherein the aqueous preparation is an aqueous solution or an aqueous colloidal solution.

3. The process of claim 1, wherein the at least one bismuth compound is contained in the aqueous preparation in a total quantity of 100 to 50,000 ppm bismuth.

4. The process of claim 1, wherein the substrate provided with the non-cross-linked CED coating film is brought into contact with the aqueous preparation by dipping, spraying, rinsing or combinations thereof.

5. The process of claim 1, wherein the contacting is made in such a way that 0.1% to 2% by weight of the bismuth originating from the at least one bismuth compound (calculated as bismuth), relative to the resin solid of the CED coating film, pass from the aqueous preparation onto and/or into the non-cross-linked CED coating film.

6. The process of claim 1, wherein the substrate provided with the still non-cross-linked CED coating film is connected as a cathode during contact with the aqueous preparation.

7. The process of claim 1, wherein the electrically conductive substrates is selected from the group consisting of metallic substrates, automotive bodies and automotive body parts.

* * * * *

UNITED STATES PATENT AND TRADEMARK OFFICE
CERTIFICATE OF CORRECTION

PATENT NO. : 7,632,386 B2 Page 1 of 1
APPLICATION NO. : 10/650410
DATED : December 15, 2009
INVENTOR(S) : Klein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this

Second Day of November, 2010

David J. Kappos
*Director of the United States Patent and Trademark Office*